July 8, 1930. C. G. MIKKELSEN 1,770,216

POULTRY FEEDER

Filed Aug. 15, 1928

Inventor
C. G. Mikkelsen

By Clarence A. O'Brien
Attorney

Patented July 8, 1930

1,770,216

UNITED STATES PATENT OFFICE

CARL G. MIKKELSEN, OF HILLIARD, FLORIDA

POULTRY FEEDER

Application filed August 15, 1928. Serial No. 299,851.

This invention pertains to improvements in poultry feeders and more especially to those types of feeding devices adapted for supporting the quantity of semi-solid buttermilk. As is well known, buttermilk in this form is very beneficial to young poultry. However, the same is not generally used for the reason that suitable means on which to offer the same to the poultry has not heretofore been considered in a practical manner. The present invention aims to supply numerous advantages over such types of devices falling within this category and the same has for its prime object the provision of a novel feeder, especially devices for supporting semi-solid buttermilk.

Another important object of the invention resides in the provision of means whereby the feeder may be adjusted as the young poultry become larger in size, without materially increasing the cost thereof.

Still another object is to provide a sanitary feeder for supplying young poultry with semi-solid buttermilk, wherein the device briefly consists of a body or rack on which the buttermilk is placed at a point spaced from the ground, so that the poultry will be compelled to stretch upwardly in order to obtain the buttermilk, yet providing sufficient space beneath the rack to permit the poultry to pass thereunder without in any manner disturbing the rack or the foot supported thereon.

After reading the following specification and claims other important objects and advantages of this invention will become apparent.

Figure 1:
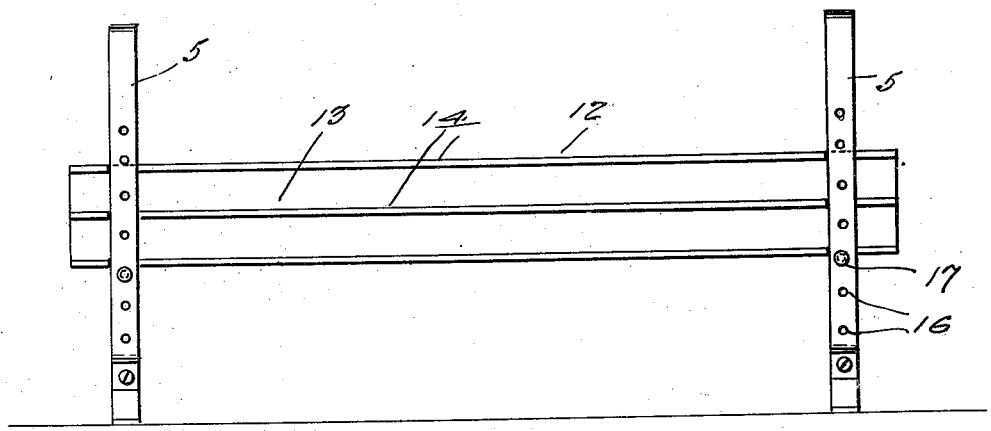
Figure 1 represents a side elevation of the improved feeder.
Figure 2:
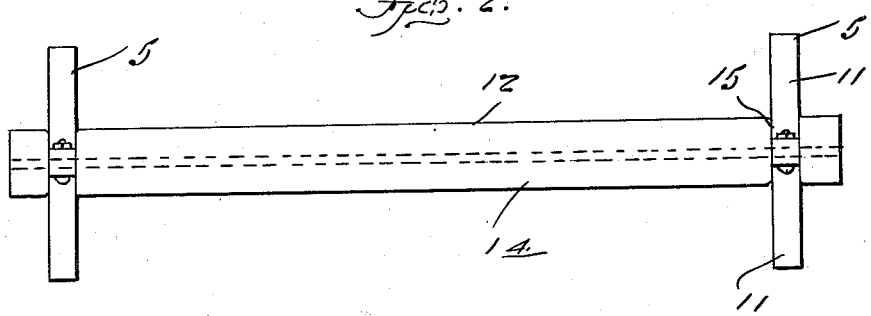
Figure 2 is a top plan view of the same.
Figure 3:
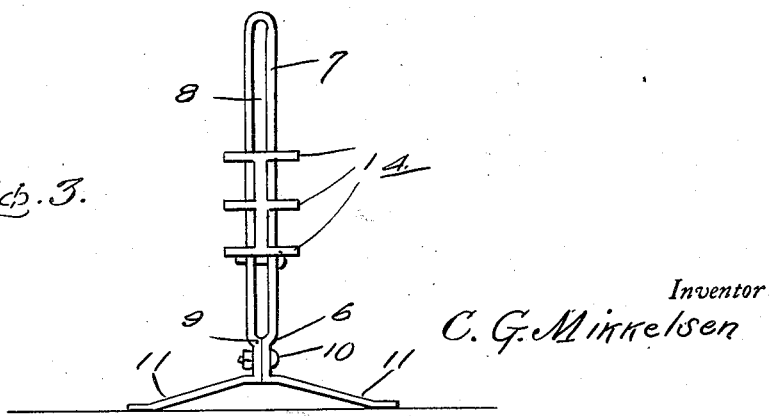
Figure 3 is an end elevation of the structure.

Now referring to the drawings wherein like numerals designate like parts, the invention consists of a pair of upright members generally referred to by the numeral 5—5. These members are of identical construction, and a description of one will suffice for both.

Each upright in construction consists in forming a metallic strap 6, to provide an upstanding post 7, having an elongated space 8, between the parallel portion thereof. The strap is brought into contact at 9 and secured in this position by a suitable bolt or rivet 10. The end portions of the straps are diverged to provide feet 11—11. Supported on the uprights 5—5 is an elongated body or rack generally referred to by numeral 12. This rack consists in construction of an elongated plate 13 provided with longitudinally extending and spaced flanges 14, on the opposite faces thereof.

Inwardly from each end of the plate 13, the flanges 14 are transversely notched as at 15, so as to permit the engagement of the rack within the space 8 of the respective uprights 5—5. By reason of this construction, the rack is permitted to slide vertically but is prevented from longitudinal movement by the protrusion of the flanges 14.

Each of the uprights 5—5 is formed with vertically spaced openings 16, through which a pin 17 is insertable. When these pins 17 are properly arranged through the openings in the uprights 5—5, the rack 12 may be brought to rest thereon and supported in substantially spaced horizontal relation with respect to the ground.

The semi-solid buttermilk, or in fact any other semi-solid food may be lodged between the flanges 14. With the food disposed in this manner, the rack 12 is elevated to the position desired, preferably to a position sufficient to compel the young poultry to stretch upwardly in order to obtain the food.

Obviously, certain changes in the specific size, shape, or materials may be resorted to, without departing from the spirit of the invention or the scope of the appended claims.

Having thus described my invention, what is claimed as new is:

1. In a poultry feeder comprising a pair of slotted uprights, a body arranged between said uprights and adapted to project at its ends through the slots thereof, means on said body whereby food may be supported, and adjusting means whereby said body may be held at different heights on the uprights.

2. In a poultry feeder comprising a pair of slotted uprights, a body arranged between said uprights and adapted to project at its ends through the slots thereof, means on said body whereby food may be supported, and adjusting means engaging said uprights, whereby the body may be held at different heights, said last mentioned means consisting in forming the uprights with vertically spaced openings, and a pin insertable through the openings of the uprights upon which the body is adapted to rest.

In testimony whereof I affix my signature.

CARL G. MIKKELSEN.